Figure 1:
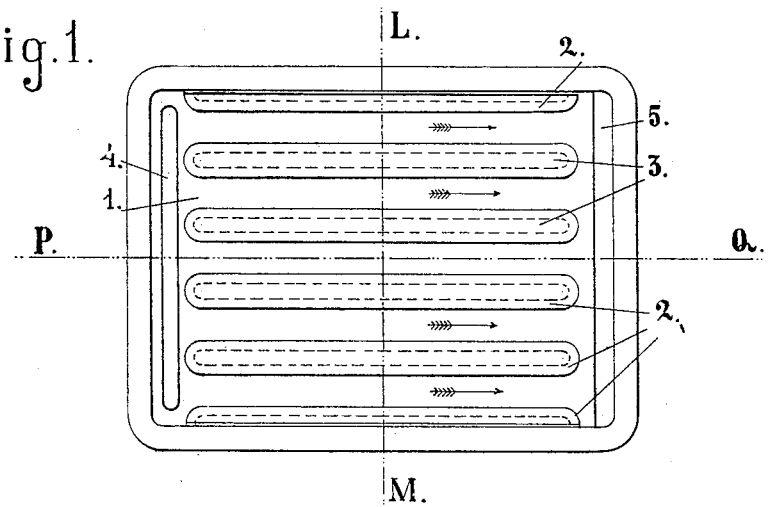

No. 803,394. PATENTED OCT. 31, 1905.
N. BOGOÏAVLENSKY & M. KROUPOVESS.
DISTILLING APPARATUS.
APPLICATION FILED JUNE 4, 1903.

4 SHEETS—SHEET 1.

Witnesses:
B. Stober
B. Sommers

Inventors:
Nicholas Bogoïavlensky,
Michael Kroupovess
by Henry Orth
Attys.

No. 803,394. PATENTED OCT. 31, 1905.
N. BOGOÏAVLENSKY & M. KROUPOVESS.
DISTILLING APPARATUS.
APPLICATION FILED JUNE 4, 1903.
4 SHEETS—SHEET 2.
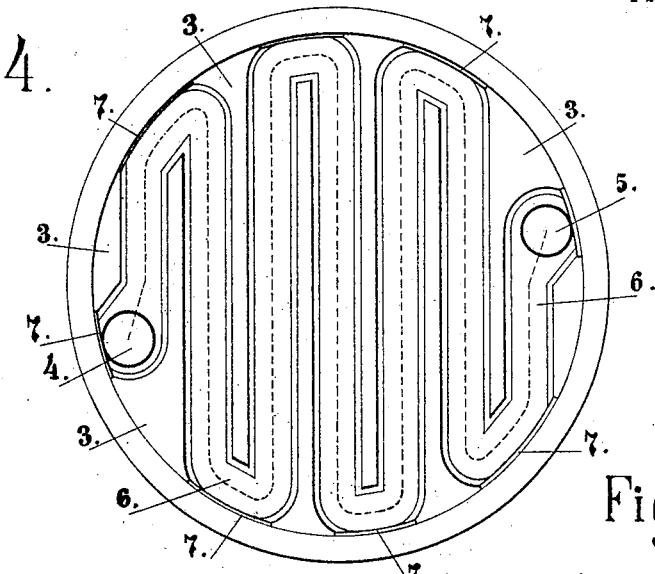
Fig. 4.
Fig. 5.
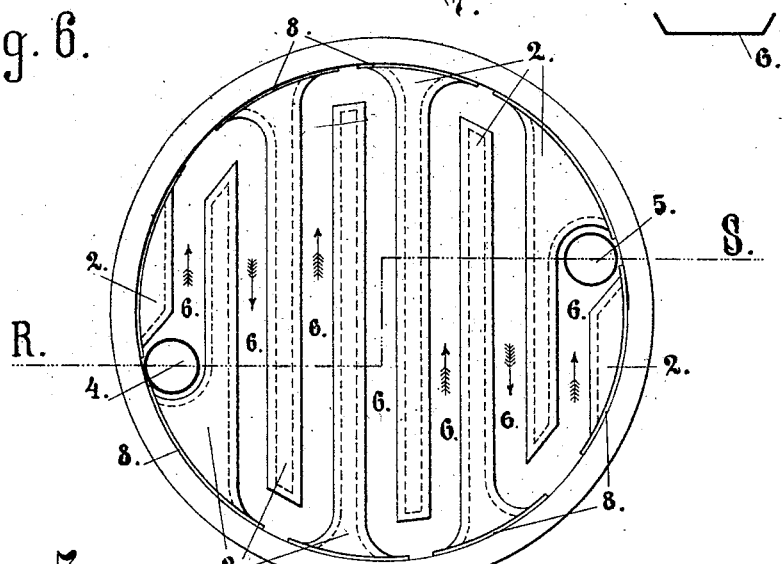
Fig. 6.
Fig. 7.
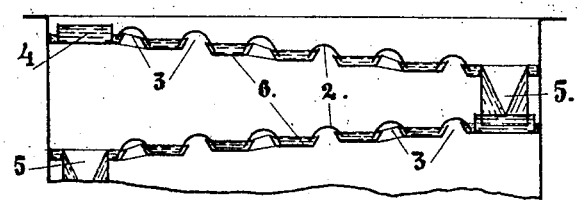

No. 803,394. PATENTED OCT. 31, 1905.
N. BOGOÏAVLENSKY & M. KROUPOVESS.
DISTILLING APPARATUS.
APPLICATION FILED JUNE 4, 1903.

4 SHEETS—SHEET 3.

Witnesses:
Inventors:
Nicholas Bogoïavlensky
Michael Kroupovess
by Attys.

No. 803,394. PATENTED OCT. 31, 1905.
N. BOGOÏAVLENSKY & M. KROUPOVESS.
DISTILLING APPARATUS.
APPLICATION FILED JUNE 4, 1903.

4 SHEETS—SHEET 4.

UNITED STATES PATENT OFFICE.

NICHOLAS BOGOÏAVLENSKY AND MICHAEL KROUPOVESS, OF ST. PETERSBURG, RUSSIA.

DISTILLING APPARATUS.

No. 803,394.  Specification of Letters Patent.  Patented Oct. 31, 1905.

Application filed June 4, 1903. Serial No. 160,075.

*To all whom it may concern:*

Be it known that we, NICHOLAS BOGOÏAVLENSKY and MICHAEL KROUPOVESS, citizens of the Empire of Russia, residing at St. Petersburg, Russia, have invented certain new and useful Improvements in Distilling Apparatus; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

Our invention has relation to stills, and more particularly to that type known as "columnar" stills having inclined trays over which the wash is caused to flow, said trays being provided with vapor-passages having their outlets above the upper face of the tray and normally sealed by the liquid flowing over such trays. In order to maintain a uniform flow of vapor through said passages and the liquid to be distilled, it has been the practice to construct the trays in the form of steps and arrange the vapor-passages in the form of short pipes on the treads, the outlets of said pipes being sealed by a loose cap dipping into the liquid on the tread, means being provided, such as overflow-partitions at the edges of each successive tread of the structure, to maintain a stratum of liquid of sufficient depth on each riser.

Our invention has for its object the construction of an inclined tray whereby the inconveniences referred to are obviated, the construction materially simplified, and the cost greatly reduced.

A further object of my invention is to so construct the tray as to bring a much greater area of liquid to be distilled in contact with the ascending vapors than is possible in any still with which we are acquainted.

The attainment of these objects does not depend upon one specific construction of tray or upon a specific arrangement of the trays in the column, so that the construction and relative arrangement of the trays may be variously modified without departing from the spirit of our invention, as will be apparent from the following detailed description thereof, reference being had to the drawings, in which—

Figure 2:
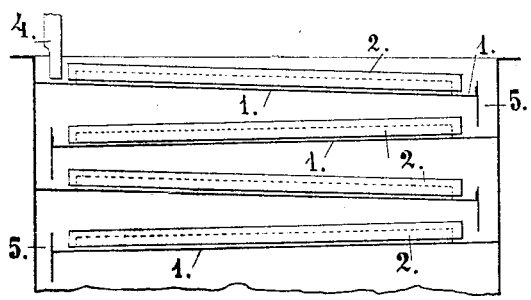
Figure 3:
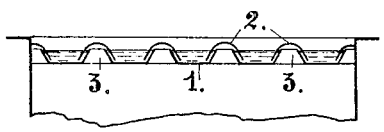
Figure 8:
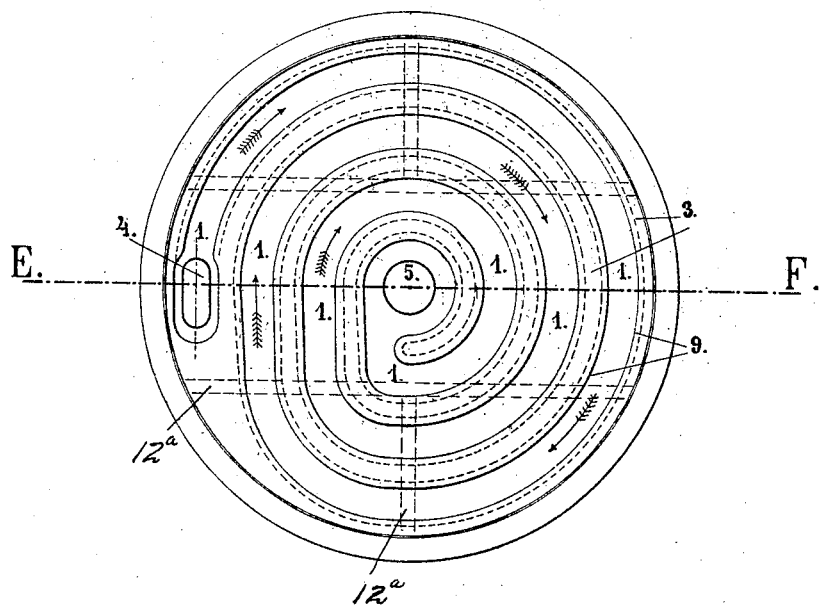
Figure 10:
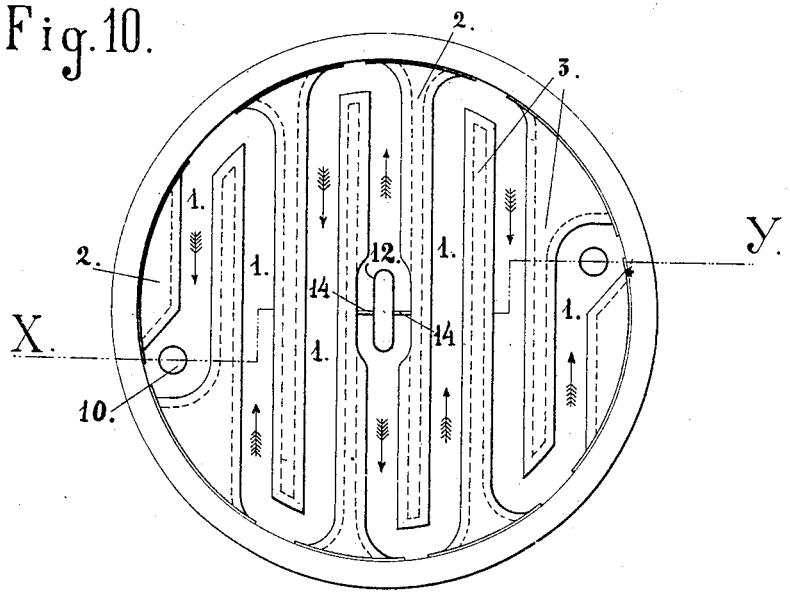
Figure 11:
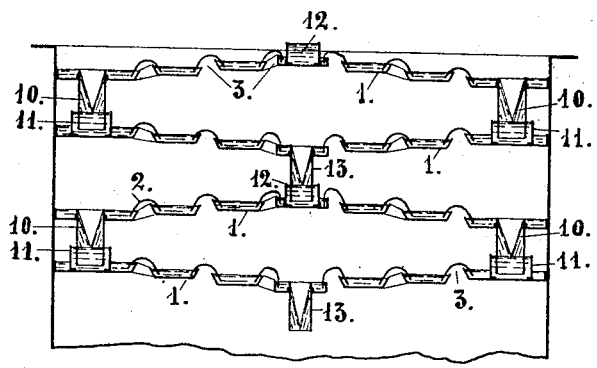

Figure 1 is a top plan view, and Figs. 2 and 3 are sections taken, respectively, on P Q and L M of said Fig. 1, illustrating so much of a section of a still-column as will be necessary to an understanding of one form of construction of tray and the relative arrangement thereof. Fig. 4 is a plan view of a section of a still-column and a tray, the sealing-caps being removed from the vapor-passages. Fig. 5 is a cross-section of a channel of the tray shown in Fig. 4. Fig. 6 is a plan view showing the sealing-caps in position; and Fig. 7 is a section on line R S of Fig. 6, said Figs. 4, 6, and 7 showing another arrangement of the vapor-passages. Fig. 8 is a plan, and Fig. 9 a section on line E F of said Fig. 8, showing still another arrangement of vapor-passages, also a different arrangement of the trays. Fig. 10 is a plan view, and Fig. 11 a section on line X Y of said Fig. 10, showing still another arrangement of the vapor-passages and a modification in the arrangement of the means for supplying the liquid to be distilled to the superposed trays.

Referring to Figs. 1 to 3 and with a view to increasing as much as possible the surface of liquid to be distilled and to be brought into contact with the vapors ascending in the column, we form vapor-passages 3 in the tray 1, extending as nearly as possible from one edge of the tray to the other, said passages having confining side and end walls projecting a suitable distance above the upper face of the tray to prevent the liquid flowing over said tray from passing through said vapor-passages.

In order to maintain a uniform hydrostatic resistance to the passage of the vapors at all points of the cap, we so construct its side and end walls that the lower edges thereof will be equidistant from the upper surface of the liquid at all points of said edges, thereby maintaining a uniform resistance around each cap, taking into account, of course, that in consequence of the comparatively rapid movement of the liquid over the trays there results a sheet or layer of liquid over the tray that constantly diminishes in depth from the receiving to the delivery end of each tray. The lower edges of the caps are consequently arranged with an inclination equal to the fall in level of the liquid due to its movement from one end of the tray or channel to the other and each cap dipping below this liquid-level to an equal extent to maintain a uniform hydrostatic resistance to the passage of vapor.

The liquid or mash to be distilled enters the tray 1 at the upper end through a suitable feed 4, where the depth of liquid on the tray will be the greatest, due to the concentration of bulk at the feed end, and will flow in the direction indicated by the arrows, distributing itself around the vapor-passages 3 to the overflow 5, that forms the feed for the next lowest tray.

The bottoms of the trays 1 may be so inclined in the direction of flow of the liquid that they will be parallel to the natural fall of the liquid-level, in which case the lower edge of the caps are to be set at an equal distance from the bottoms of the trays, as shown in Figs. 1 to 3.

In Figs. 4 to 6 and 7 we have shown an inclined tray formed of an inclined, zigzag, or sinuous channel 6 (shown in section in Fig. 5) and soldered or otherwise fixed in the cylindrical shell of the column at the points 7.

The free spaces 3 between convolutions or turns of the tray are covered by caps 2, the lower edges of which dip below the surface of the liquid to an equal extent and are soldered or otherwise secured to the shell of the column at the points 8.

In Fig. 7, which illustrates a section on the line R S, Fig. 6, the inclination of the trays is shown exaggerated for the sake of clearness. Each cap 2 is arranged with that long edge which is nearest the inlet at a higher level than its other long edge which is nearer the outlet and dips into the adjacent convolution of the tray, because the lower edge follows the fall of level of the liquid flowing on the tray from inlet to outlet.

The liquid, mash, and the like when entering at one end of a tray and having to flow through several convolutions or past vapor-passages have a tendency to heap up or have a greater depth at the entrance end than at the discharge end of a tray. To avoid this, the bottom of the tray must have such an inclination in the direction of flow that there will be a uniform depth of liquid from one end to the other, and this inclination is parallel to the surface of the liquid flowing over the tray, having a uniform depth from the beginning to the end of its passage—that is, the inclination is equal to the natural fall of liquid-level.

The bottoms of the trays are preferably placed at such an angle that they will be parallel to the surface of the liquid—that is, to the fall of liquid-level from inlet to outlet of each tray—in which case the lower edges of the caps will be parallel to said bottoms except at the turns in the sinuous channel, where the liquid is liable to bank or heap up, due to centrifugal force, and at which points the distance between the tray and lower edge of the cap must be correspondingly altered to maintain a uniform hydrostatic pressure. The same arrangement may be used without essential alteration with a column of any other cross-sectional form and also with the frequently-employed rectangular column.

Figure 9:
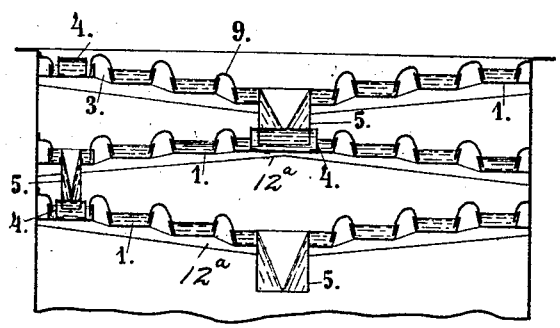

In the modification shown in Figs. 8 and 9 the channels are spiral in form and inlets and outlets are arranged alternately at the sides and at the center, in consequence of which the trays formed by the channels have alternately a dished and conical general shape, so that the channels will be inclined alternately to and from the center. The spiral channels are mounted on suitable cross-beams $12^a$, the upper surfaces of which are stepped to receive the channels.

As the difference in level between the inlet and the outlet of each tray increases with the velocity of flow of the liquid and with the length of the path to be taken by the liquid, the difference in level between the commencement and the end of each tray would become too great in columns of large cross-section and would entail a corresponding reduction in the number of trays per unit of height of the column. Now in the modification illustrated in Fig. 10 in plan and in Fig. 11 in section on the line X Y of Fig. 10 this drawback is obviated in the case of a zigzag channel arranged on the principle shown in Fig. 4. In this case the liquid flows through the outlet-neck 10 of the topmost tray, Fig. 11, into shallow vessels 11 of the next lower tray and flows thence in two oppositely-directed streams from the periphery toward the center, because the corresponding parts of the channel have the necessary inclination and the outlet 13, which is common to both parts, is situated at the center. From the central outlet the liquid then flows into the shallow vessel 12, which is situated at the center of the next lower tray and which has its upper edges in a horizontal plane. In this arrangement the channel 1 is divided by the vessel 12 and the cross-walls 14, Fig. 10, into two portions which are inclined in opposite directions and which have their separate outlets at 10 10. As the upper edges of the vessel 12 are horizontal and the portions of the vessel which lie on the right and left of the cross-walls 14 have an equal length of wall, the liquid is distributed equally into both portions of the channel. By this arrangement the following advantages are gained, viz: First, the quantity of liquid flowing per second past the cross-sectional area of the channel (the velocity of flow) is reduced to one-half, and, second, the distance which the liquid must travel is reduced to one-half, and thereby the difference in level between the inlet and the outlet of each tray is therefore reduced to one-fourth.

Having thus described our invention, what we claim as new therein, and desire to secure by Letters Patent, is—

1. In a distilling-column, trays formed of one or more channels having upturned edges and a continuous fall or inclination, spaces intervening between adjacent portions of the channels, and a cap or caps in the form of continuous inverted trough or troughs covering the spaces and whose lower edges approximate the bottoms of the channels, said edges having the same inclination as the channels, whereby there will be a continuous inclined passage for liquid throughout each tray without any obstructions whatever, substantially as described.

2. In a distilling-column, trays formed of one or more sinuous channels having upturned edges and a continuous fall or inclination from beginning to end of each channel, intervening spaces between the adjacent parts of the sinuations, and caps in the form of inverted troughs covering the spaces and whose lower edges are parallel to the bottoms of the channels, whereby an unobstructed flow of liquid will take place from the beginning to the end of each channel, substantially as described.

3. In a distilling-column, sinuous trays, one set of trays of the column inclined from the center to the side and discharge-passages at the side, and another set of sinuous alternately-arranged trays inclined from the side to the center and having central discharge-passages, said trays having a continuous inclination, and caps covering the spaces between the convolutions of the sinuous trays whose lower edges are parallel to the bottoms of the trays thereby maintaining a uniform hydrostatic pressure, substantially as described.

4. In a distilling-column, trays each having sinuous troughs extending from opposite sides to a central discharge-passage and alternate trays having sinuous troughs extending from the center to the sides, said troughs inclined in the direction of flow of the liquid, spaces intervening between the convolutions of the troughs forming vapor-passages, and caps covering said spaces whose lower edges are parallel to the bottoms of the troughs whereby a uniform hydrostatic pressure is maintained, substantially as described.

In testimony that we claim the foregoing as our invention we have signed our names in presence of two subscribing witnesses.

NICHOLAS BOGOÏAVLENSKY.
MICHAEL KROUPOVESS.

Witnesses:
H. A. LOVIAGUIRE,
W. STEININGER.